(12) United States Patent
Hayward

(10) Patent No.: US 10,182,041 B2
(45) Date of Patent: *Jan. 15, 2019

(54) METHOD AND APPARATUS FOR SECURE DATA TRANSMISSIONS

(71) Applicant: CipherTooth, Inc, American Fork, UT (US)

(72) Inventor: Jerry Glade Hayward, American Fork, UT (US)

(73) Assignee: CipherTooth, Inc., American Fork, UT (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/389,967

(22) Filed: Dec. 23, 2016

(65) Prior Publication Data

US 2017/0111324 A1 Apr. 20, 2017

Related U.S. Application Data

(63) Continuation-in-part of application No. 14/192,738, filed on Feb. 27, 2014, now Pat. No. 9,531,680.

(Continued)

(51) Int. Cl.
*H04L 9/32* (2006.01)
*H04L 29/06* (2006.01)
*H04L 9/14* (2006.01)

(52) U.S. Cl.
CPC ...... *H04L 63/0464* (2013.01); *H04L 63/0227* (2013.01); *H04L 63/1475* (2013.01);
(Continued)

(58) Field of Classification Search
CPC ......... H04L 2463/041; H04L 2463/121; H04L 63/0227; H04L 63/0464; H04L 63/1475; H04L 63/168; H04L 63/205
See application file for complete search history.

(56) References Cited

U.S. PATENT DOCUMENTS 6,065,117 A * 5/2000 White ................. G06Q 20/367
380/255
6,161,139 A * 12/2000 Win ...................... G06F 21/604
709/223

(Continued)

FOREIGN PATENT DOCUMENTS

CN 1282161 A 1/2001
CN 102624740 A 8/2012
(Continued)

OTHER PUBLICATIONS

Gutzmann, Kurt. "Access control and session management in the HTTP environment." IEEE Internet Computing 5.1 (2001): 26-35. (Year: 2001).*

(Continued)

*Primary Examiner* — Michael Simitoski
(74) *Attorney, Agent, or Firm* — Kunzler, PC

(57) ABSTRACT

An apparatus, system, and method are disclosed for secure data transmissions. A method includes receiving a request for data that is encrypted according to a first encryption scheme, and determining a first public IP address associated with the request. The first public IP address identifies a remote client that created the request and is located in a field of a data packet that includes the request. The method includes determining a second public IP address associated with the request that identifies a sender of the request and is determined dynamically when the request is received. The method includes verifying an authenticity of the request in response to the first public IP address of the remote client matching the second public IP address of the sender. The method includes encrypting the requested data according to a second encryption scheme, and transferring the data to the remote client.

22 Claims, 10 Drawing Sheets

Related U.S. Application Data

(60) Provisional application No. 61/770,300, filed on Feb. 27, 2013.

(52) U.S. Cl.
CPC .......... *H04L 63/168* (2013.01); *H04L 63/205* (2013.01); *H04L 2463/041* (2013.01); *H04L 2463/121* (2013.01)

(56) References Cited

U.S. PATENT DOCUMENTS

| | | |
|---|---|---|
| 6,523,068 B1 | 2/2003 | Beser et al. |
| 6,725,376 B1* | 4/2004 | Sasmazel .............. G06F 21/33 713/176 |
| 6,944,762 B1 | 9/2005 | Garrison |
| 6,985,953 B1* | 1/2006 | Sandhu ............... G06F 17/3089 709/225 |
| 6,993,595 B1* | 1/2006 | Luptowski ........ H04L 29/12009 370/392 |
| 7,023,997 B1 | 4/2006 | Schier |
| 7,321,660 B2 | 1/2008 | Mont et al. |
| 7,434,052 B1 | 10/2008 | Rump |
| 7,472,268 B2 | 12/2008 | Gray |
| 8,095,789 B2 | 1/2012 | Komura et al. |
| 8,886,923 B1 | 11/2014 | Breau et al. |
| 8,959,650 B1* | 2/2015 | Richards .................. G06F 21/44 709/227 |
| 2002/0097868 A1* | 7/2002 | Watanabe ................ G06F 7/582 380/46 |
| 2002/0188845 A1* | 12/2002 | Henderson ............. G06Q 20/02 713/168 |
| 2003/0110399 A1* | 6/2003 | Rail ..................... H04L 63/0815 726/5 |
| 2004/0139339 A1* | 7/2004 | Yeh ........................... G06F 21/62 713/193 |
| 2004/0196980 A1* | 10/2004 | Turner .................... G06K 7/0008 380/270 |
| 2005/0102522 A1* | 5/2005 | Kanda .................. H04L 63/0823 713/176 |
| 2006/0075477 A1* | 4/2006 | Shenoy ................. G06F 21/335 726/7 |
| 2006/0294366 A1 | 12/2006 | Nadalin et al. |
| 2007/0109124 A1* | 5/2007 | Park ...................... G06Q 20/341 340/572.1 |
| 2007/0255941 A1* | 11/2007 | Ellis ....................... H04L 9/0662 713/151 |
| 2007/0266426 A1* | 11/2007 | Iyengar ................. H04L 9/3213 726/5 |
| 2008/0025512 A1 | 1/2008 | Nakajima |
| 2008/0072305 A1* | 3/2008 | Casado ............... H04L 63/0492 726/11 |
| 2008/0219439 A1* | 9/2008 | Miyoshi ................ G06F 21/608 380/44 |
| 2009/0077383 A1* | 3/2009 | de Monseignat ... H04L 63/0823 713/175 |
| 2009/0119766 A1 | 5/2009 | Huetter et al. |
| 2009/0161866 A1 | 6/2009 | Riedl |
| 2009/0271462 A1* | 10/2009 | Schneider ............... G06F 21/34 708/250 |
| 2009/0313353 A1* | 12/2009 | Lou ........................ G06F 21/10 709/219 |
| 2009/0327714 A1 | 12/2009 | Yaghmour et al. |
| 2010/0046553 A1* | 2/2010 | Daigle .................... G06F 21/35 370/474 |
| 2010/0185863 A1* | 7/2010 | Rabin ...................... H04L 9/085 713/171 |
| 2010/0191975 A1* | 7/2010 | Chase ................. G06F 21/6254 713/176 |
| 2010/0228978 A1 | 9/2010 | Kudo |
| 2010/0241753 A1* | 9/2010 | Garbajs ................ H04L 63/0428 709/227 |
| 2010/0306524 A1* | 12/2010 | Runkis ................... H04L 9/0894 713/150 |
| 2010/0306545 A1* | 12/2010 | Seki ...................... G06Q 10/107 713/175 |
| 2011/0244798 A1* | 10/2011 | Daigle .................... H04L 63/08 455/41.2 |
| 2011/0246777 A1* | 10/2011 | Buckley ................ H04L 9/0844 713/172 |
| 2011/0274275 A1 | 11/2011 | Seitz |
| 2011/0307705 A1 | 12/2011 | Fielder |
| 2011/0314271 A1 | 12/2011 | Boccon-Gibod et al. |
| 2012/0033811 A1 | 2/2012 | Hawkes |
| 2012/0079104 A1* | 3/2012 | Casado ............... H04L 63/0492 709/224 |
| 2012/0109830 A1 | 5/2012 | Vogel |
| 2012/0131354 A1 | 5/2012 | French |
| 2013/0046982 A1 | 2/2013 | Suh et al. |
| 2013/0135658 A1 | 5/2013 | Kogure |

FOREIGN PATENT DOCUMENTS

| | | |
|---|---|---|
| EP | 1729237 A1 | 12/2006 |
| GB | 2488753 A | 9/2012 |

OTHER PUBLICATIONS

Yao Chen et al., Detedting and Preventing IP-spoofed Distributed DoS Attacks, International Journal of Network Secuirty, vol. 7 No. 1, Jul. 2008, pp. 70-81.

* cited by examiner

METHOD AND APPARATUS FOR SECURE DATA TRANSMISSIONS

CROSS-REFERENCES TO RELATED APPLICATIONS

This is a continuation-in-part application that claims the benefit of and claims priority to U.S. Provisional Patent Application No. 61/770,300 entitled "HTTPS—E SYSTEM" and filed on Feb. 27, 2013, for Jerry Hayward, and U.S. patent application Ser. No. 14/192,738 entitled "METHOD AND APPARATUS FOR SECURE DATA TRANSMISSIONS" and filed on Feb. 27, 2014, which is incorporated herein by reference.

FIELD

This invention relates to computing devices and more particularly relates to transmitting data securely.

BACKGROUND

Transmitting electronic data between computing devices occurs in nearly every arena of society. In some scenarios, data transmissions between systems on a network may be intercepted by other systems that have access to the network traffic. Although the data being transmitted may be encrypted, there are various ways in which a nefarious observer may fool a transmitter of data and a receiver of data.

In another scenario, a nefarious observer may inject himself between transmitters and receivers of data such that the transmitters and receivers may not be aware that the observer may be recording and reading data being transmitted between them. Certain weaknesses in network security may be exploited to create such tunnels.

In certain scenarios, encrypted data may use certificates, and certificate authorities to validate ownership of encryption keys. The keys may be used to encrypt and decrypt data. An observer of these encrypted transmissions may still decrypt the data and gain access by cracking encryption keys.

Additionally, readily available applications may interrupt such secured transmissions and offer users encryption keys that may appear valid for websites they visit while in fact their information may be intercepted. Such an attack, a "man in the middle" attack is often undetectable to either the client or the server. Public/private keys as well as certificates are often "valid" for a year or more, giving a "man in the middle" ample time to use a cracked key or to crack a key and gain access to what was intended to be private information.

SUMMARY

An apparatus for secure data transmissions is disclosed. A system and method also perform the functions of the apparatus. In one embodiment, the apparatus includes a request module that receives a request for data. The request may be encrypted according to a first encryption scheme. The request module, in another embodiment, determines a first public Internet protocol address associated with the request. The first public Internet protocol address may identify a remote client that created the request. The first public Internet protocol address may be located in a field of a data packet that includes the request.

The request module, in certain embodiments, determines a second public Internet protocol address associated with the request. The second public Internet protocol address may identify a sender of the request. The second public Internet protocol address may be determined dynamically when the request is received. In one embodiment, an authenticity of the request is verified in response to the first public Internet protocol address of the remote client matching the second public Internet protocol address of the sender.

The apparatus, in certain embodiments, includes an encryption module that encrypts the data according to a second encryption scheme in response to the authenticity of the request being verified. In certain embodiments, the apparatus includes a transfer module that transmits the encrypted data to the remote client. At least a portion of the request module, the encryption module, and the transfer module may comprise one or more of hardware and executable code, the executable code stored on one or more computer readable storage media.

The apparatus, in various embodiments, includes a setup module that transmits a setup package. The setup package may include cryptographic elements. At least a portion of the setup module may comprise one or more of hardware and executable code, the executable code stored on one or more computer readable storage media. In some embodiments, the setup package comprises a list of encryption schemes, a list of encryption keys, and a selection algorithm.

In a further embodiment, the transfer module further indicates the second encryption scheme to the client using an index into a shared list of encryption schemes. The transfer module may further indicate encryption keys to the client using an index into a shared list of encryption keys. In certain embodiments, the second encryption scheme is randomly selected from a list of available encryption schemes. In another embodiment, the request module further determines the first encryption scheme based on a current time value. In certain embodiments, the request module further discards the request in response to the first public Internet protocol address of the remote client not matching the second public Internet protocol address for the request.

A method, in one embodiment, includes receiving, by use of a processor, a request for data. The request may be encrypted according to a first encryption scheme. The method may include determining a first public Internet protocol address associated with the request. The first public Internet protocol address may identify a remote client that created the request. The first public Internet protocol address may be located in a field of a data packet that includes the request.

The method, in another embodiment, includes determining a second public Internet protocol address associated with the request. The second public Internet protocol address may identify a sender of the request. The second public Internet protocol address may be determined dynamically when the request is received. In one embodiment, the method includes verifying an authenticity of the request in response to the first public Internet protocol address of the remote client matching the second public Internet protocol address of the sender. In certain embodiments, the method includes encrypting the requested data according to a second encryption scheme in response to the authenticity of the request being verified and transferring the encrypted data to the remote client.

The method, in another embodiment, includes transmitting a setup package to the remote client. The setup package may include cryptographic elements. In some embodiments, the cryptographic elements comprise a list of encryption schemes, encryption keys, and an encryption scheme selection algorithm. In various embodiments, the method includes indicating the second encryption scheme to the client using an index into a shared list of encryption schemes and indicating encryption keys to the client using an index into a shared list of encryption keys.

In one embodiment, the second encryption scheme is randomly selected from a list of available encryption schemes. In another embodiment, the method includes determining the first encryption scheme based on a current time value. In certain embodiments, the method includes discarding the request in response to the first public Internet protocol address not matching the second public Internet protocol address for the request.

A computer program product includes a computer readable storage medium having program code embodied therein. The program code, in one embodiment, is readable/executable by a processor for receiving a request for data, the request encrypted according to a first encryption scheme. In another embodiment, the program code is readable/executable by a processor for determining a first public Internet protocol address associated with the request. The first public Internet protocol address may identify a remote client that created the request. The first public Internet protocol address may be located in a field of a data packet that includes the request/

In certain embodiments, the program code is readable/executable by a processor for determining a second public Internet protocol address associated with the request. The second public Internet protocol address may identify a sender of the request. The second public Internet protocol address may be determined dynamically when the request is received. In another embodiment, the program code is readable/executable by a processor for verifying an authenticity of the request in response to the first public Internet protocol address of the remote client matching the second public Internet protocol address of the sender. In a further embodiment, the program code is readable/executable by a processor for encrypting the requested data according to a second encryption scheme in response to the authenticity of the request being verified and transferring the encrypted data to the remote client.

In one embodiment, the program code is readable/executable by a processor for transmitting a setup package to the remote client. The setup package may include cryptographic elements. In another embodiment, the cryptographic elements comprise a list of encryption schemes, encryption keys, and a first encryption scheme selection algorithm. In some embodiments, the program code is readable/executable by a processor for indicating the second encryption scheme to the client using an index into a shared list of encryption schemes, and indicating encryption keys to the client using an index into a shared list of encryption keys.

In certain embodiments, the program code is readable/executable by a processor for randomly selecting the second encryption scheme from a list of available encryption schemes. In a further embodiment, the program code is readable/executable by a processor for determining the first encryption scheme based on a current time. In various embodiments, the program code is readable/executable by a processor for discarding the request in response to the first public Internet protocol address not matching the second Internet protocol address for the request.

In one embodiment, a method includes determining a first public Internet protocol address, and requesting data from a remote server. The request may be encrypted according to a first encryption scheme and a first encryption key. The encrypted request may include the first public Internet protocol address located in a field of a data packet that includes the request, and a second public Internet protocol address that identifies a sender of the request. The second public Internet protocol address may be determined dynamically when the request is received at the remote server. An authenticity of the request may be verified in response to the first public Internet protocol address of the remote client matching the second public Internet protocol address of the sender.

In some embodiments, the method includes receiving data from the remote server in response to the authenticity of the request being verified. The data may be encrypted using a second encryption scheme that is different from the first encryption scheme. The data may include a third public Internet protocol address identifying the remote server.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
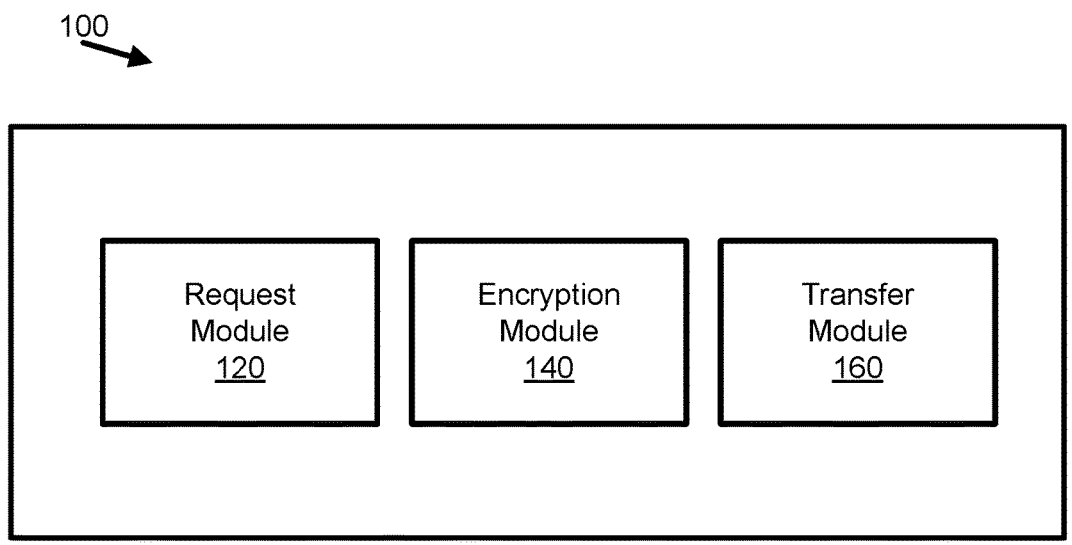
FIG. 1 is a schematic block diagram illustrating an apparatus in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating an apparatus in accordance with one embodiment of the present invention. In one embodiment, the apparatus 100 includes a request module 120, an encryption module 140, and a transfer module 160.

In one embodiment, the apparatus 100 may operate as a requester of data. The request module may 120 may determine a public Internet protocol (IP) address for the apparatus 100. As one skilled in the art may appreciate, the request module 120 may request the public IP address of the apparatus 100 from another server, or other, or the like. In one embodiment, the public IP address of the apparatus 100 may be different than the local IP address for the apparatus 100.

In one example, the request module 120 may determine the public IP address based on an HTTP call to another server. In another example, the request module 120 may determine the public IP address by communicating with a network time protocol server, using traceroute, or other ways one skilled in the art may appreciate.

In one example, the apparatus 100 may operate as part of a local area network (LAN), and may have a local IP address for the LAN. As the apparatus 100 communicate with servers that are not on the LAN, the public IP address for the apparatus 100 may be the IP address of a router, a gateway, or other, or the like as one skilled in the art may appreciate.

In another embodiment, the request module 120 may indicate an encryption scheme that may be used to encrypt received data. The remote server may or may not encrypt the data according to the indicated encryption scheme.

In one embodiment, the apparatus 100 as a requester of data, may include an encryption module 140 that may encrypt the request according to an initial encryption scheme. An encryption scheme as described herein may include a wide variety of encryption schemes as one skilled in the art may appreciate. Of course, data may be encrypted in many different ways and this disclosure is meant to include all such schemes. An encryption scheme may include one or more encryption keys, encryption algorithms, or other, or the like.

In one embodiment, the request module 120 may determine the initial encryption scheme based on a current time value. In one example, the request module 120 may determine a current time from a remote time server. The request module 120 may receive the time value, and use the time value to look up the initial encryption scheme in a list of available encryption schemes. For example, the time value may be 4,365,798, and the list of encryption schemes may include 40 encryption schemes. The request module 120 may divide the time value by the number of encryption schemes to determine an indicated encryption scheme. For example, a remainder value of the division may be used to indicate the encryption scheme and/or an encryption key. In another example, the request module 120 may select the last two digits to use to look up the initial encryption scheme. Of course, one skilled in the art may appreciate other ways in which a numerical value may be parsed, or the like, to determine an indicator into a list of encryption schemes.

In one embodiment, the apparatus 100, as a requester of data, may include the transfer module 160. The transfer module may receive encrypted requested data from a remote server according to the request. The received data may have been encrypted according to a different encryption scheme than the initial encryption scheme. The encryption module 140 may determine the different encryption scheme based on indicators in a header for the encrypted data, and may decrypt the received data.

In another embodiment, the apparatus 100 may operate as a provider of data. The apparatus 100 may include a request module 120 that receives an encrypted request for data from a remote client.

In another embodiment, the request module 120 may verify the request based on the provided public IP address of the client. In one example, the request module 120 may determine a source IP address of the request by analyzing network packets that include the request. The request module 120 may compare the source IP address with the provided public IP address. In response to the two IP addresses matching, the request module 120 may verify the authenticity of the request. In a scenario where the public IP address fails to match the source IP address, the discrepancy may indicate a potential man in the middle. Therefore, in this scenario, the request module 120 may discard the request.

In another embodiment, the apparatus 100 includes an encryption module 140 that encrypts the requested data according to a different encryption scheme. In one embodiment, the apparatus 100 and a remote client may share a list of encryption schemes. In another embodiment, the apparatus 100 and the remote client may share a list of encryption keys. In one embodiment, the request may include indicators that indicate one of the encryption schemes and/or one of the encryption keys. For example, the request may indicate the third encryption scheme and the tenth encryption key.

In one embodiment, the encryption module 140 may randomly select an encryption scheme. The randomly selected encryption scheme may be different than an indicated encryption scheme in the request. In another embodiment, the encryption module 140 may randomly select an encryption key from a list of encryption keys. In one embodiment, the encryption module 140 may select an encryption scheme, and/or encryption keys according to a predefined order. For example, the encryption module 140 may select a subsequent encryption scheme than with a previous request. In another example, the encryption module 140 may select a preceding encryption scheme than with a previous request.

In another embodiment, the encryption module 140 may select a different encryption scheme and/or a different encryption key according to a selection algorithm. For example, a selection algorithm may include using even encryption schemes in a list, odd schemes, schemes according to a mathematical expression, equation, or other, or the like. In one example, the remote client may request data and the encryption module may encrypt the data according to an encryption scheme at index 2. In response to a subsequent request, the encryption module 140 may encrypt the data according to an encryption scheme at index 4, etc.

In one embodiment, the apparatus 100 may include a transfer module 160 that transmits the data to the remote client. Of course, one skilled in the art may recognize many ways the apparatus 200 may transfer data to the remote client, such as, but not limited to, a wired network, a wireless network, via a storage device, or other, or the like.

In another embodiment, the transfer module 160 may indicate the different encryption scheme to the remote client using an index into a shared list of encryption schemes. As previously described, the apparatus 100 and a remote client may share a list of encryption schemes. In one example, the transfer module 160 may include an indicator in a header for the encrypted data. The header may include numerical values that indicate the encryption scheme. For example, the header information may include a numerical value of two to indicate the second encryption scheme for the data, and a numerical value of 12 to indicate the $12^{th}$ encryption key in a shared list of encryption keys. In another embodiment, a portion of the public IP address may be used indicate the encryption scheme and/or the encryption key.

Figure 2:
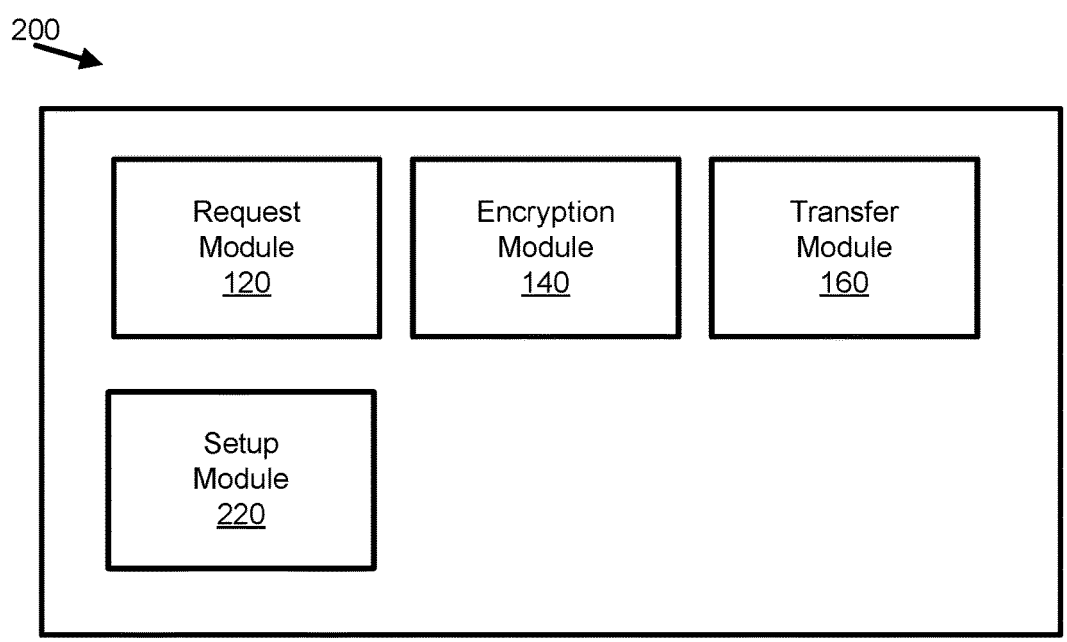
FIG. 2 is a schematic block diagram illustrating an apparatus in accordance with the present invention.

FIG. 2 is a schematic block diagram illustrating one embodiment of an apparatus 200 in accordance with one embodiment of the present invention. In one embodiment, the apparatus 200 may include the request module 120, the encryption module 140, the transfer module 160, and a setup module 220. The request module 120, the encryption module 140, and the transfer module 160 may or may not be substantially similar to those depicted in FIG. 1.

In one embodiment, the apparatus 200 operating as a data provider may include a setup module 220 that transmits a setup package, the setup package comprising cryptographic elements. In one embodiment, the setup package includes a list of encryption schemes. In another embodiment, the setup package includes a list of encryption keys.

In another embodiment, the setup module 220 may operate at a receiver of data. The setup module 220 may receive the setup package, and integrate the setup package into the apparatus. Integration of the setup package may include installing files, encryption tables, encryption lists, encryption keys, selection algorithms, or the like.

In one embodiment, the setup package may include a table of encryption algorithms, a table of encryption keys, a selection algorithm for selecting an encryption algorithm and/or encryption keys. The setup package may be compressed and/or encrypted according to a pre-defined encryption scheme. The setup package may be digitally signed to allow a remote client, or other device, to verify the integrity of the setup package. In one example, the setup package may include a hash of the setup package. This may ensure that that the setup package has not been altered between the setup module 220 and a remote client.

In another embodiment, the setup module 220 may periodically reorder the list of encryption schemes and/or the list of encryption keys. In response to changing one or more lists, the setup module 220 may transfer updated lists to a remote client. In one example, the setup module 220 may randomly shuffle entries in a list. In another example, the setup module 220 may shift one or more entries in the list. Of course, one skilled in the art may appreciate many other ways to alter a list and this disclosure is meant to include all such ways. In one embodiment, the setup module 220 may update a remote client with the altered list, or other altered cryptographic elements.

In another embodiment, the setup module 220 may receive indications from a user that indicate how to reorder a list. In one example, the apparatus 200 may provide a user interface for a user to specify how to reorder a list. In another embodiment, the setup module 220 operating at a data receiver may reorder a list of encryption schemes based on indicators from another setup module 220 operating at a data provider.

In one embodiment, the setup package may include a selection algorithm. The selection algorithm may indicate to a remote client which initial encryption scheme to use. The selection algorithm may also indicate which encryption schemes or encryption keys to use for subsequent requests for data.

In one example, the apparatus 200 may operate as a web server. Remote clients may request web pages from the apparatus 200. The setup package may be a helper object. The remote client may transmit the request using a secure hyper-text transfer protocol (HTTPS). The client may install the setup package into a web browser. Therefore, in certain embodiments, the client may request and receive web pages from the apparatus 200 by submitting encrypted requests and receiving encrypted data (e.g. representing the requested web pages) as described herein. In one example, the setup package may include JQUERY libraries to modify the browser application.

In one embodiment, the setup package may simply override other executable code. Overriding executable code, or libraries would allow the remote client to integrate the setup package without requiring modifications to the web browser, for example.

According to this example, the resulting web pages communicated through this secure method may not be cracked using standard script breaking methods because it is not script. In other examples, the encryption module 140 may rotate encryption schemes based on time and date stamps from time servers. The setup module 220 may support updates (regular or otherwise) through the webpage via its version requirements. In one example, the current encryption scheme may be displayed in another window.

In one example, the setup package may include the list of available encryption methods. In another example, the setup package may be configured to download the list of available encryption methods.

The remote client may request data from the apparatus 200 using an initial encryption scheme selected by a selection algorithm. In one example, the initial encryption scheme may be the first encryption scheme in the list. In another example, the initial encryption scheme may be a scheme corresponding to a day of the month, or other. The request module 120 may determine the same initial encryption scheme using the same selection algorithm. Therefore, in certain embodiments, the remote client, and the request module 120 may determine the same initial encryption scheme without the remote client communicating the encryption scheme to the request module 120. This may allow the request module 120 to decrypt the encrypted request.

In one embodiment, the setup module 220 may negotiate with a Kerberos server to set up the list of encryption schemes and/or keys. In another embodiment, the request may include a header. In one example, the header may include a date value, the IP address of the apparatus 100, the IP address of the remote client, a value indicating the initial encryption scheme, a control indicator, a version value, a universal resource location string, or other, or the like.

The header may be encrypted following the date value, and other values in the header may be contiguously stored in the request. Because the request includes numerical values instead of strings, in some circumstances, the encrypted request may be more difficult to decrypt or interpret. In another example, IP addresses in the header may be reordered. Because the request module 120 may easily determine the IP address for the apparatus 100, the request module 120 may determine which IP address is associated with the remote client. Reordering the IP addresses may make it more difficult for a nefarious individual to decrypt and/or interpret the request.

In one embodiment, the setup module 220 may transmit a list of encryption scheme and/or a list of encryption keys in response to the request module 120 receiving a request as previously described. Therefore, in certain embodiments, the communication between the remote client and the apparatus 200 may be dynamic. Dynamic, as described herein, may include a setup module 220 transmitting a new setup package in response to each request for data. Actively changing the lists of encryption schemes may make it more difficult for a passive observer of the network traffic to decrypt the request and/or the data.

Figure 3:
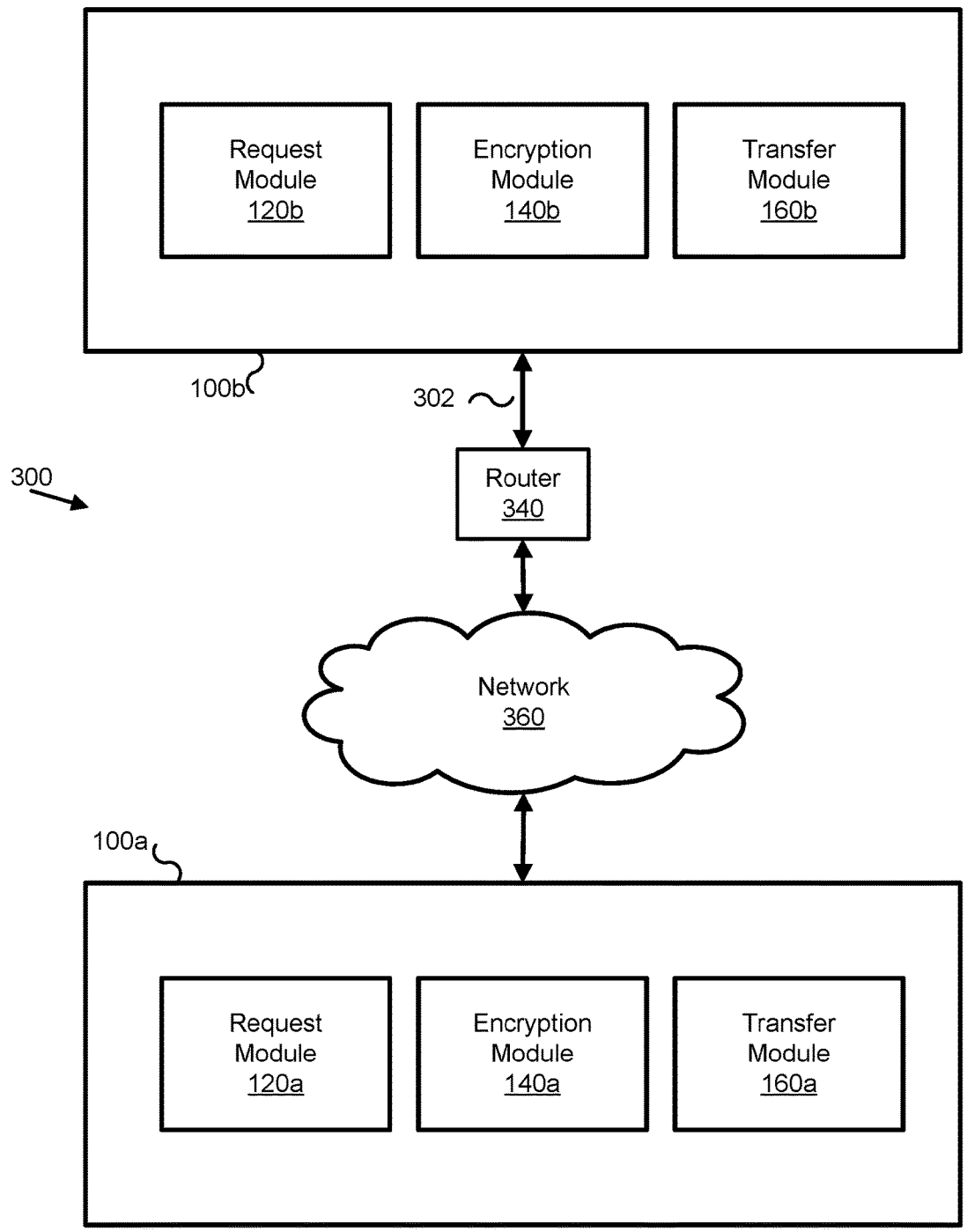
FIG. 3 is a schematic block diagram illustrating a system in accordance with the present invention.

FIG. 3 is a schematic block diagram illustrating one embodiment of a system 300 in accordance with one embodiment of the present invention. In one embodiment, the system 300 may include a data receiver 100b, a router 340, a network 360, and a data provider apparatus 100a. The data receiver 100b may include a request module 120b, an encryption module 140b, and a transfer module 160b. The data provider may include a request module 120a, an encryption module 140a, and a transfer module 160a.

The data receiver 100b and the data provider 100a may be distinct computing environments, distinct physical machines, or the like. Therefore, although the data receiver 100b and the data provider 100a may both include a request module 120, the request module 120b and the request module 120a may not be connected in any way. Therefore, executable code executing at the request module 120b may be entirely separate executable code than executable code operating at the request module 120a. In one embodiment, executable code operating at request module 120a and executable code operating at request module 120b may be substantially similar, but of course, this is not necessarily the case. This may also be the case for the encryption module 140a and the encryption module 140b. This may also be the case for the transfer module 160a and the transfer module 160b.

In one embodiment, the data receiver 100b may operate as part of a LAN 302 and may be assigned an IP address for the LAN 302. In one example, the IP address for the LAN may be 192.168.0.50. The data receiver 100b may request a connection with the apparatus 100a. The connection request may be received by the router 340 and forwarded to the apparatus 100a through a wide area network (WAN) 360. In one example, the WAN 360 may be the Internet. In one example, the router may route network traffic from the LAN 302 to the WAN 360. The router may include an IP address for the LAN, such as, 192.168.0.1, and an IP address for the WAN, such as 172.56.89.23. In one example, the apparatus 100 may receive the connection request from the remote client 340. The request module 120 may determine that the source IP address for the data receiver 100b is the IP address of the router (e.g. 172.56.89.23). Therefore, the request module 120 may determine that the request is valid (is actually from the data receiver 100b) based on the indicated public IP address for the data receiver 100b matching the determine IP address of the router 340.

Figure 4:
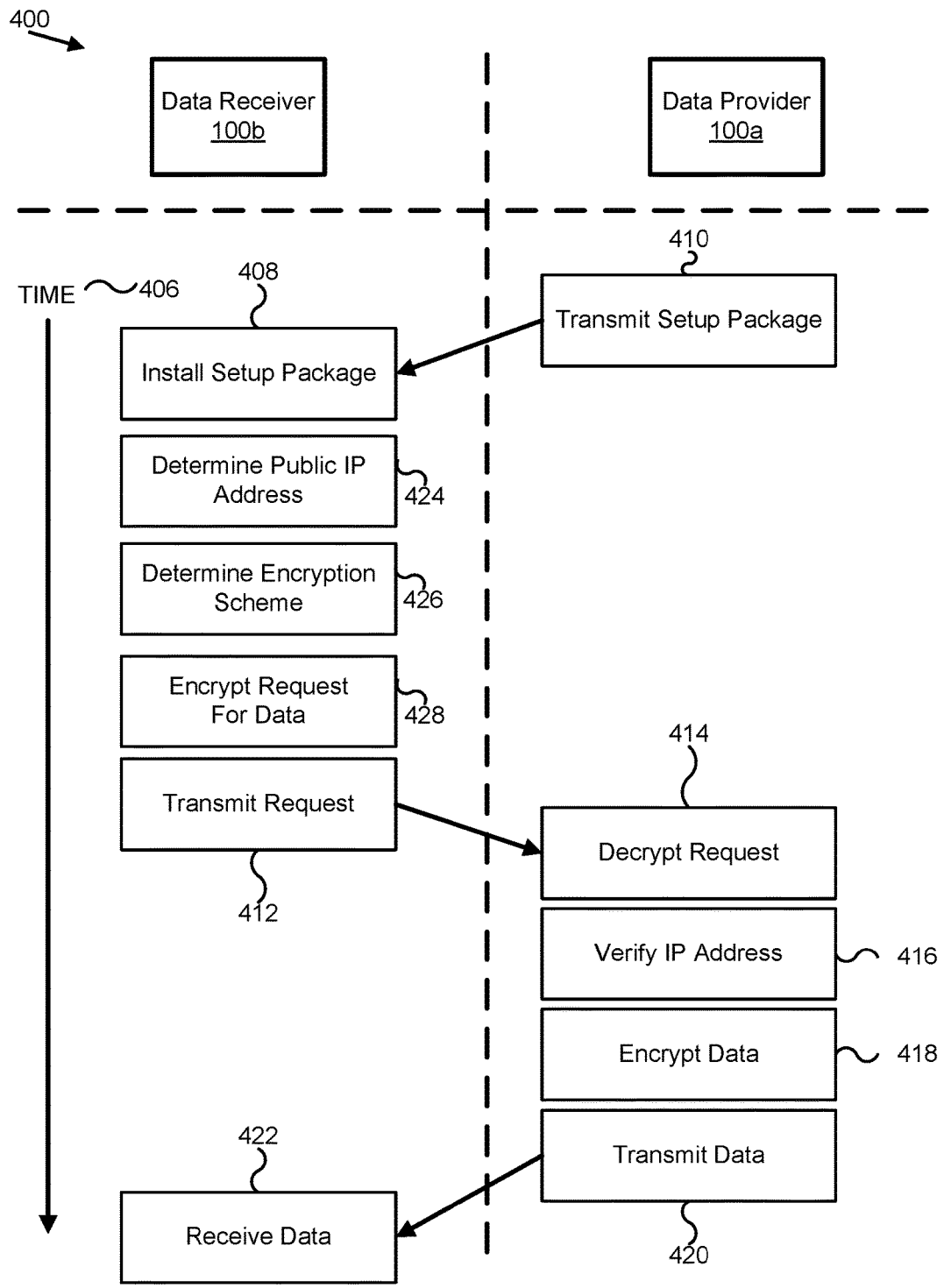
FIG. 4 is a timeline diagram illustrating a method in accordance with one embodiment of the present invention.

FIG. 4 is a timeline diagram illustrating one example of a system a method in accordance with one embodiment of the present invention. In one embodiment, the transfer module 160, operating at the data provider, may transmit 410 a setup package to the data receiver 100b. The data receiver 100b may install 408 the setup package. The data receiver 100b may determine 424 the public IP address for the data receiver 100b. The data receiver 100b may determine 426 an initial encryption scheme. The data receiver 100b may encrypt 428 a request for data. The data receiver 100b may transmit 412 the encrypted request to the apparatus 100.

The request module 120a of the data provider may decrypt 414 the request. The request module 120a may verify 416 the public IP address for the data receiver 100b. The encryption module 140a may encrypt 418 the data. The transfer module 160a may transmit the encrypted data to the data receiver 100b. The data receiver 100b may receive 422 the encrypted data.

In another embodiment, the transfer module 160 may indicate to the data receiver 100b which encryption scheme to use for a subsequent request for data. In another embodiment, the request module 120 may compare an IP address in a footer of network packets that include the request to verify that there is no man in the middle attack. A discrepancy between the source IP address and the public IP address provided by the data receiver 100b may indicate that there may be a man in the middle, and the transfer module 160 may terminate any data transfers with the data receiver 100b.

In one example, the setup module 220 may transmit an updated setup package in response to the remote client request a web page. Therefore, in certain embodiments, the setup module 220 may indicate a different list of encryption keys for respective transmissions of data from the apparatus 100. In one embodiment, the setup module 220 may generate and use different lists of encryption schemes and/or encryption keys for different remote clients. For example, the setup module 220 may transmit a first list of encryption schemes to remote client A, and may transmit a second list of encryption schemes and/or encryption keys to remote client B.

Figure 5:
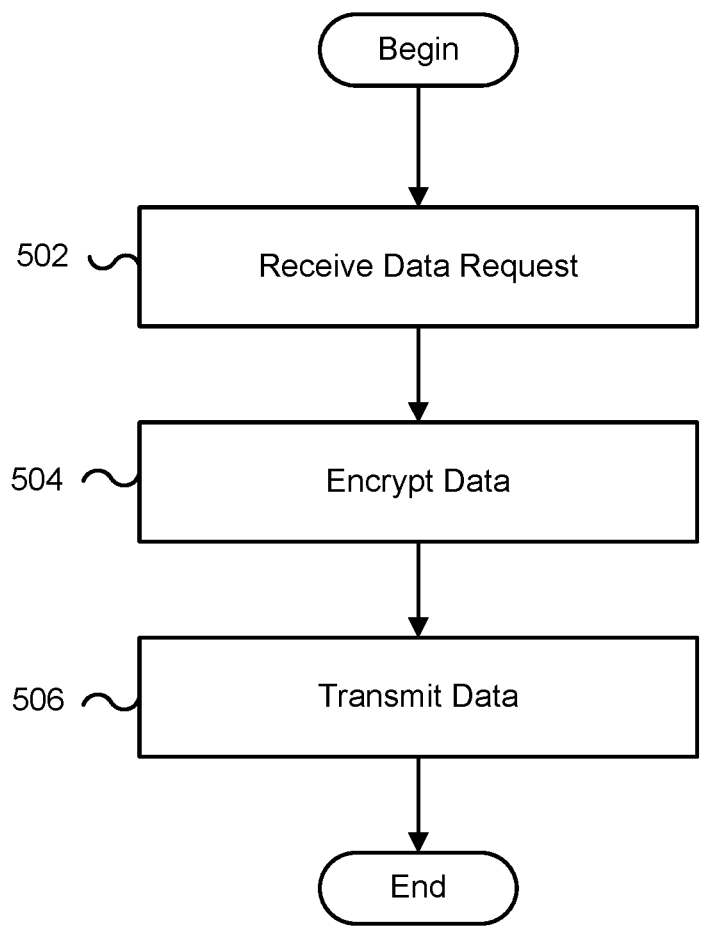
FIG. 5 is a flow chart diagram illustrating a method in accordance with one embodiment of the present invention.

FIG. 5 is a schematic block diagram illustrating one embodiment of a method 500 in accordance with one embodiment of the present invention. In one embodiment, the method may begin and a request module 120 may receive 502 a request for data from a data receiver 100b. The request may include a public Internet protocol address of the remote client. The request may be encrypted according to an initial encryption scheme. As previously described, the initial encryption scheme may be selected by a variety of different ways. The encryption module 140 may encrypt 504 the requested data according to a different encryption scheme. The transfer module 160 may transfer 506 the data to the data receiver 100b and the method may end. In another embodiment of the method 500, the encryption module 140 may randomly select the different encryption scheme from a list of available encryption schemes.

Figure 6:
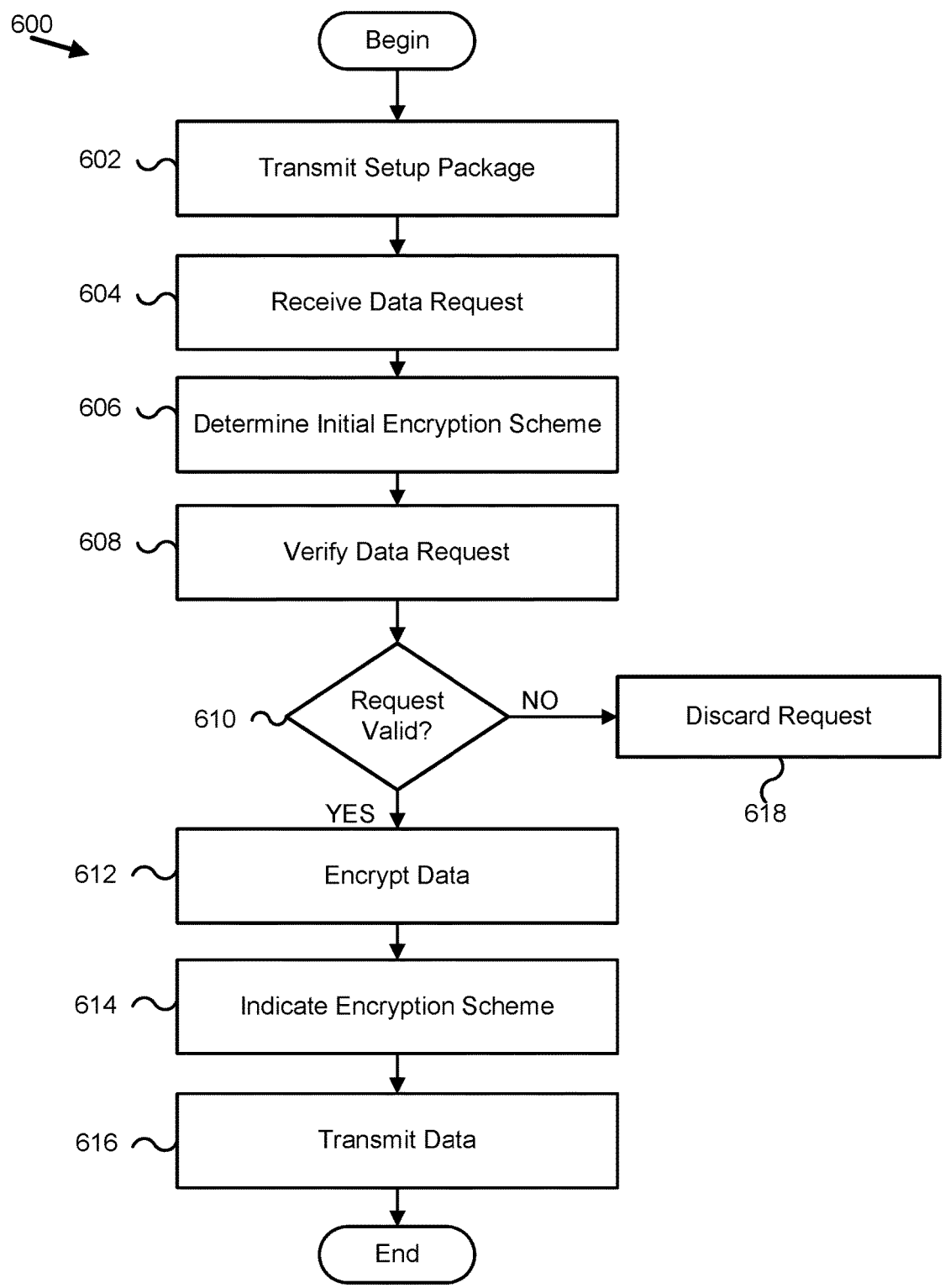
FIG. 6 is a flow chart diagram illustrating a method in accordance with one embodiment of the present invention.

FIG. 6 is a schematic block diagram illustrating one embodiment of a method 600 in accordance with one embodiment of the present invention. The method 600 may begin and the setup module 220 may transmit a setup package to a remote client. The setup package may include cryptographic elements that may be used to encrypt requests for data. The request module 120 may receive 602 a request for data as described herein. The encryption module 140 may determine 604 the initial encryption scheme. In one embodiment, the encryption module 140 may determine 604 the initial encryption scheme based on a current time. The request module 120 may verify the data request by comparing the provided public IP address of the client with a source IP address for network packets that may include the request. If the request is not valid 610, the request module 120 may discard 618 the request. If the request is valid 610, the encryption module 140 may encrypt the requested data according to a different encryption scheme than the encryption scheme used to submit the request.

The transfer module 160 may indicate 614 the different encryption scheme to the data receiver 100b. In one embodiment, the transfer module 160 may indicate the different encryption scheme to the data receiver 100b by providing an index into the list of available encryption schemes. The transfer module 160 may also provide a value that is an index into a list of encryption keys to be used to decrypt the data. The transfer module 160 may transmit 616 the encrypted requested data to the client that requested the data and the method 600 may end.

In another embodiment of the method 600, the cryptographic elements may include a list of encryption schemes, a list of encryption keys, an encryption selection algorithm, or other cryptographic elements as one skilled in the art may appreciate.

Figure 7:
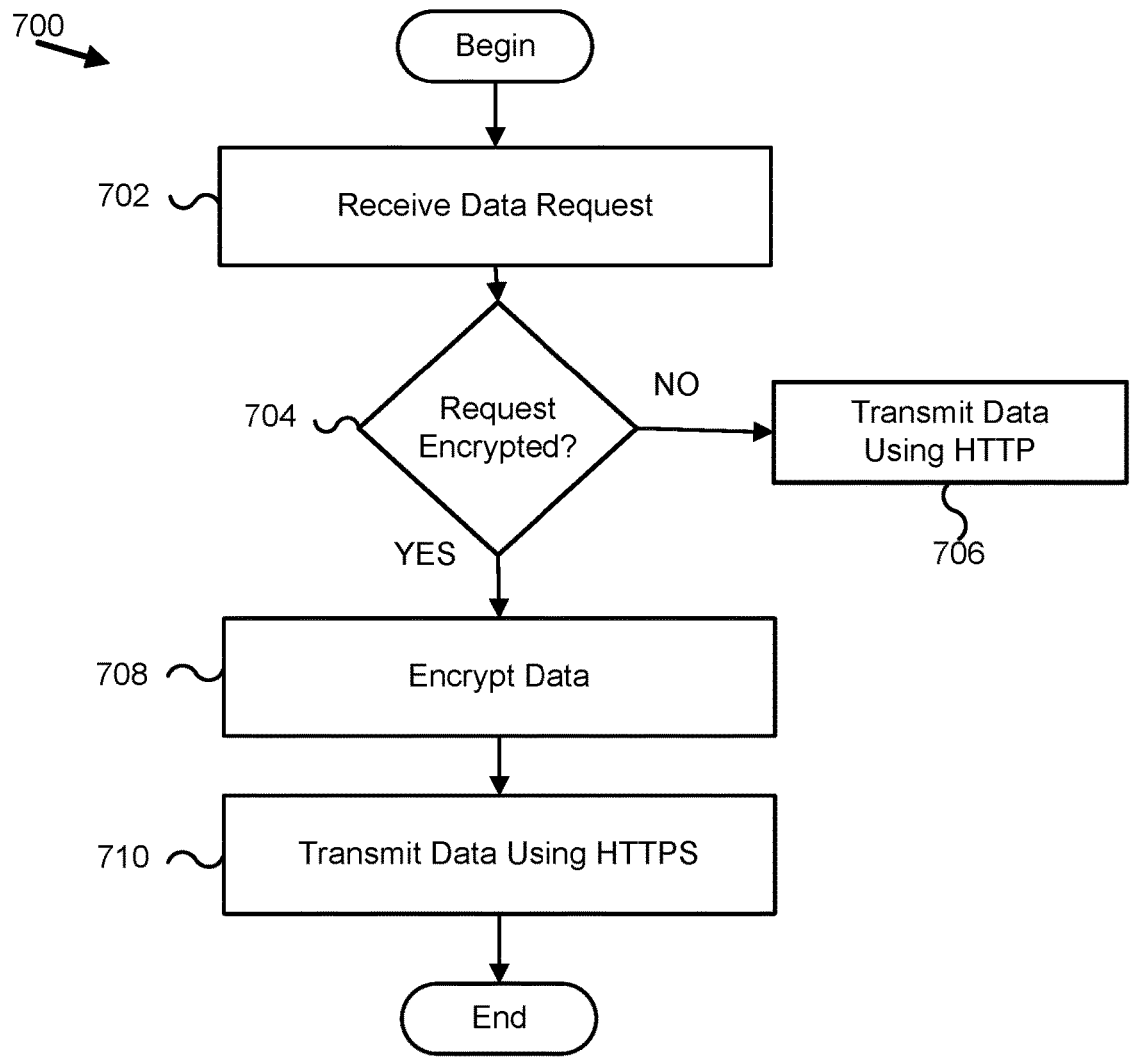
FIG. 7 is a flow chart diagram illustrating a method in accordance with one embodiment of the present invention.

FIG. 7 is a schematic block diagram illustrating one embodiment of a method 700 in accordance with one embodiment of the present invention. In one embodiment, the method may begin and the request module 120 may receive 702 a request for data from a remote client. If 704 the request is not encrypted, the transfer module 160 may transmit the requested data to the client before the encryption module 140 encrypts the data.

For example, a web browser operating at a data receiver 100b may request one or more web pages from the request module 120. In response to the request using a hypertext markup language (HTTP) protocol instead of an HTTPS protocol, the transfer module 160 may transfer the requested data to the data receiver 100b without the data being encrypted by the encryption module 140. In response to the request using an HTTPS protocol, the encryption module 140 may encrypt 708 the requested data as described herein. The transfer module 160 may transfer 710 the encrypted requested data to the data receiver 100b using the HTTPS protocol and the method 700 may end.

Figure 8:
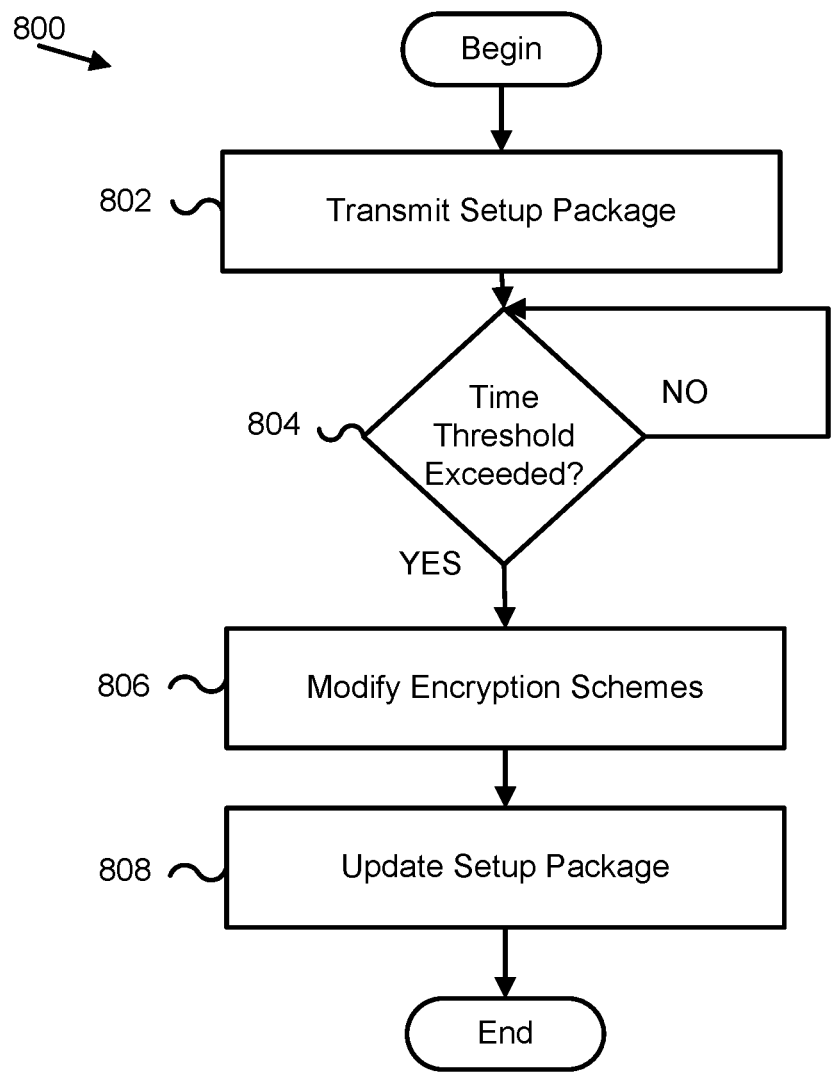
FIG. 8 is a flow chart diagram illustrating a method in accordance with one embodiment of the present invention.

FIG. 8 is a schematic block diagram illustrating one embodiment of a method 800 in accordance with one embodiment of the present invention. In one embodiment, the method 800 may begin and the setup module 220 may transmit 802 a setup package to a data receiver 100b. In response to a time threshold being exceeded 804, the setup module 220 may modify a list of encryption schemes, a list of encryption keys, a selection algorithm, or other. The setup module 220 may transmit an updated setup package to the data receiver 100b and the method 800 may end.

In one example, the setup module 220 may rotate encryption schemes in the list of encryption schemes every 5 minutes, every hour, every day, or at other times. In certain embodiments, the request module may strip the public IP address from a footer of network packets that may carry the request. In one embodiment, the public IP address of be included in a header for the request, or included inside the encrypted request.

In another method, the request module 120 may receive a request from a data receiver 100b for a web page, the request module 120 may transmit a setup package to the data receiver 100b. The data receiver 100b may verify that a received list of encryption schemes is up to date, based on a current time. The data receiver 100b may transmit an encrypted request. The data receiver 100b may determine a public IP address and may transmit an encrypted request to the request module 120.

The request module 120 may validate the IP address. The encryption module 140 may select a different encryption scheme and/or encryption keys and may transmit an authorization to the requester indicated that the request was accepted. The authorization may include an indicator that indicates the different encryption scheme. The transfer module 160 may transmit the data according to the different encryption scheme and/or different encryption keys.

In one embodiment, the setup module 220 may transmit the setup package to the requested, or to the remote client, using a one-time pad as one skilled in the art may appreciate. In another embodiment, the setup module 220 may transmit an updated setup package in response to one or more encryption keys expiring.

Figure 9:
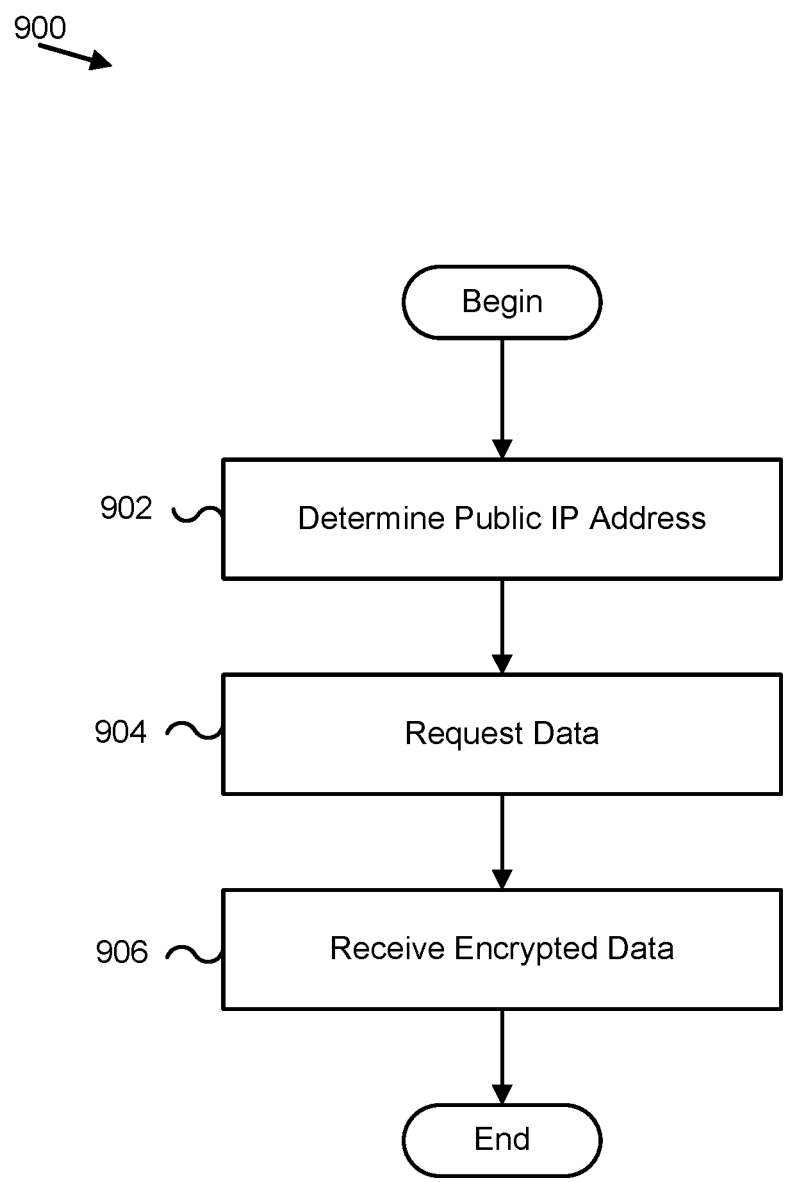
FIG. 9 is a flow chart diagram illustrating a method in accordance with one embodiment of the present invention.

FIG. 9 is a flow chart diagram illustrating a method 900 in accordance with one embodiment of the present invention. In one embodiment, the method 900 may begin and the request module may determine 902 a public IP address. The request module 120 may request 904 data from a remote server. The request module 120 may encrypt the request according to an initial encryption scheme and an initial encryption key. The request module 120 may include the public IP address in the encrypted request. The transfer module 160 may receive 906 data from the remote server. In one embodiment, the received data may be encrypted using an encryption scheme that is different from the initial encryption scheme. In another embodiment, the encrypted data may include a public IP address of the remote server. Including a public IP address in encrypted transmission may prevent a man in the middle from deceiving a request module 120 or a transfer module 160 because a different IP address would be detected by either module.

Figure 10:
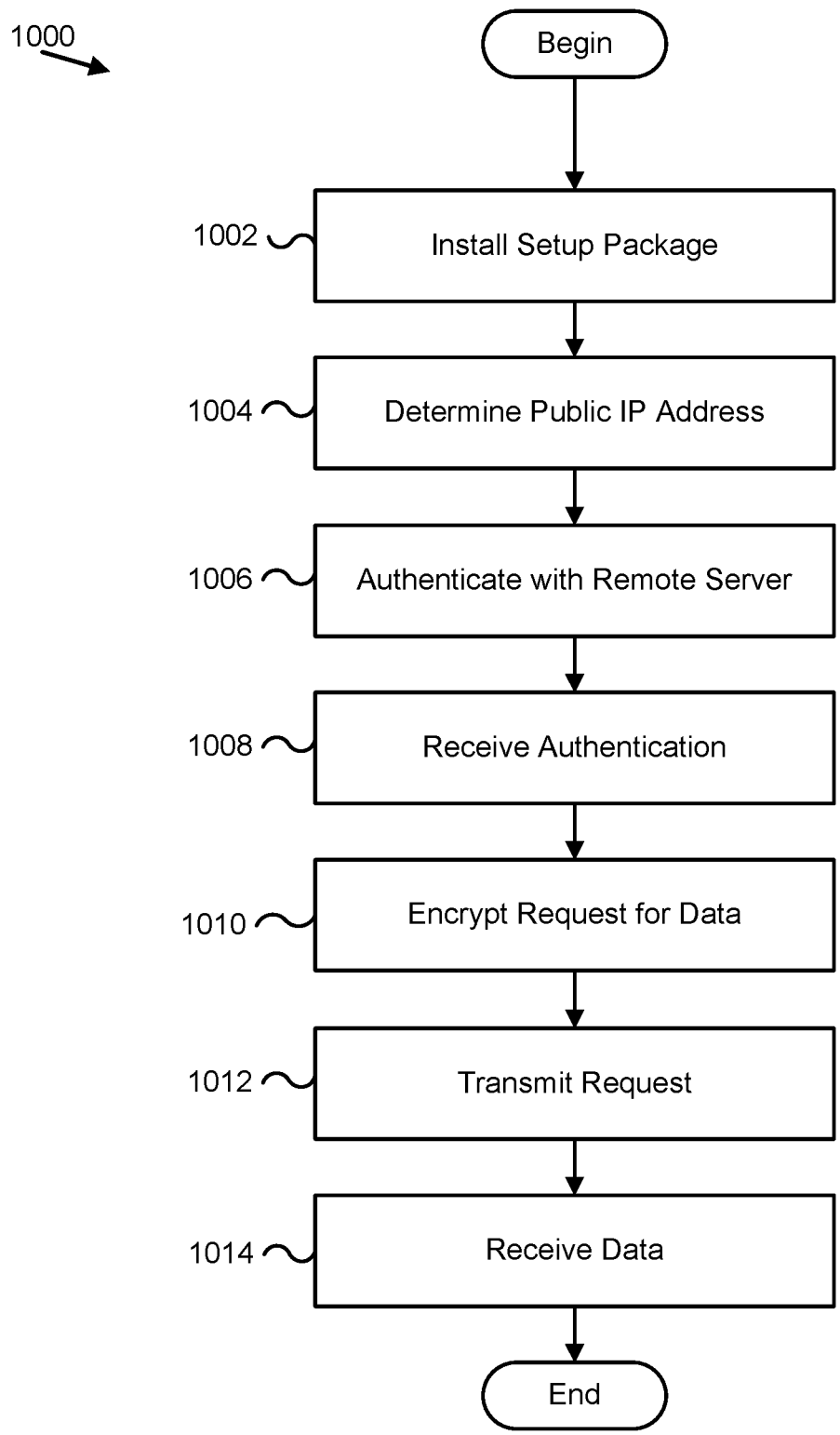
FIG. 10 is a flow chart diagram illustrating a method in accordance with one embodiment of the present invention.

FIG. 10 is a flow chart diagram illustrating a method 1000 in accordance with one embodiment of the present invention. In one embodiment 1000, the method may begin and the request module 120 may install 1002 a setup package. The setup package may include one or more cryptographic elements as previously described. The request module 120 may determine 1004 a public IP address for the apparatus 100b. The request module 120 may authenticate 1006 with a remote server. In one example, the remote server may have provided the setup package. The request module 120 may receive 1008 an authentication from the remote server. The encryption module 140 may encrypt 1010 the request. The transfer module 160 may transmit 1012 the request to the remote server. In one embodiment, the remote server may be the apparatus 100a. The transfer module 160 may receive 1014 the requested data and the method may end.

In one embodiment, a remote server, or a "remote" client may mean that the client or server reside on a different network than the apparatus 100. For example, a remote server may be on a different network than a client. A remote client may be on a different network than a server. The different network may be described using LAN boundaries, IP address subnets, or other network delineations. Therefore, a data receiver 100b and a data provider 100a may reside on different LANs, but this is not necessarily the case.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other.

Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

Reference throughout this specification to an "embodiment," an "example" or similar language means that a particular feature, structure, characteristic, or combinations thereof described in connection with the embodiment is included in at least one embodiment of the present invention(s). Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Reference throughout this specification to features, advantages, or similar language does not imply that all of the features and advantages that may be realized with the present invention(s) should be or are in any single embodiment of the invention(s). Rather, language referring to the features and advantages is understood to mean that a specific feature, advantage, or characteristic described in connection with an embodiment is included in at least one embodiment of the present invention(s). Thus, discussion of the features and advantages, and similar language, throughout this specification may, but do not necessarily, refer to the same embodiment.

Furthermore, the described features, advantages, and characteristics of the invention(s) may be combined in any suitable manner in one or more embodiments. One skilled in the relevant art will recognize that the invention(s) can be practiced without one or more of the specific features or advantages of a particular embodiment. In other instances, additional features and advantages may be recognized in certain embodiments that may not be present in all embodiments of the invention(s).

The tables built into the module may be encrypted internally before the module is encrypted. The tables may be sufficiently large that it may be extremely difficult to reverse engineer them. All that is required to make them large is one unique setting in a row, thus an encryption algorithm that uses a different encryption module 140 is just as useful as a new algorithm, as long as the encryption module 140 is not predictable and unique. Thus strong encryption algorithm's need not be many and keys can be multiplied to give the necessary volume to the table. Table reordering is just as effective a way to break someone's attempt to crack this system as adding new encryption algorithms.

In an additional embodiment, the setup module 220 may generate tables on the fly and transmit them to the client on request "on the fly" without a new module being downloaded. The module could choose when to change methods based on an algorithm determined by the customer. The tables in memory may be overwritten every time the module is updated, making it difficult for a hacker to keep up with changes. Each time the module changes protocols for encryption, all collected data to that point may be rendered useless for decrypting the current chunk of data, thus we are secure from prying eyes on the internet.

It is understood that the included embodiments are only illustrative of the application of the principles of the present invention(s). The present invention(s) may be embodied in other specific forms without departing from its spirit or essential characteristics. The described embodiment is to be considered in all respects only as illustrative and not restrictive. The scope of the invention(s) is, therefore, indicated by the appended claims rather than by the foregoing description. All changes which come within the meaning and range of equivalency of the claims are to be embraced within their scope.

Thus, while the present invention(s) has been fully described above with particularity and detail in connection with what is presently deemed to be the most practical and preferred embodiment of the invention(s), it will be apparent to those of ordinary skill in the art that numerous modifications, including, but not limited to, variations in size, materials, shape, form, function and manner of operation, assembly and use may be made, without departing from the principles and concepts of the invention(s) as set forth in the claims. Further, it is contemplated that an embodiment may be limited to consist of or to consist essentially of one or more of the features, functions, structures, methods described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a request module that:
    receives a request for data from a remote client, the request encrypted according to a first encryption scheme;
    checks a first public Internet protocol address associated with the request, the first public Internet protocol address identifying the remote client that created the request, the first public Internet protocol address determined dynamically at the remote client at a time when the request is generated, the remote client querying a server to determine the first public IP address, the first public IP address stored in a field of a data packet that includes the request; and determines a second public Internet protocol address associated with the request, the second public Internet protocol address identifying a sender of the request, the second public Internet protocol address determined dynamically when the request is received, wherein an authenticity of the request is verified in response to the first public Internet protocol address of the remote client matching the second public Internet protocol address of the sender;

an encryption module that encrypts the data according to a second encryption scheme in response to the authenticity of the request being verified; and a transfer module that transmits the encrypted data to the remote client, wherein said modules comprise one or more of hardware circuits, programmable hardware devices, and a processor executing code.

2. The apparatus of claim 1, further comprising a setup module that transmits a setup package, the setup package comprising cryptographic elements, wherein at least a portion of the setup module comprises one or more of hardware and executable code, the executable code stored on one or more computer readable storage media.

3. The apparatus of claim 2, wherein the setup package comprises a list of encryption schemes, a list of encryption keys, and a selection algorithm.

4. The apparatus of claim 3, wherein the transfer module further indicates the second encryption scheme to the client using an index into a shared list of encryption schemes, the transfer module further indicating encryption keys to the client using an index into a shared list of encryption keys.

5. The apparatus of claim 1, wherein the second encryption scheme is randomly selected from a list of available encryption schemes.

6. The apparatus of claim 1, wherein the request module further determines the first encryption scheme based on a current time value.

7. The apparatus of claim 1, wherein the request module further discards the request in response to the first public Internet protocol address of the remote client not matching the second public Internet protocol address for the request.

8. A method comprising:
receiving, by use of a processor, a request for data, the request encrypted according to a first encryption scheme;

checking a first public Internet protocol address associated with the request, the first public Internet protocol address identifying the remote client that created the request, the first public Internet protocol address determined dynamically at the remote client at a time when the request is generated, the remote client querying a server to determine the first public IP address, the first public IP address stored in a field of a data packet that includes the request determining a second public Internet protocol address associated with the request, the second public Internet protocol address identifying a sender of the request, the second public Internet protocol address determined dynamically when the request is received, verifying an authenticity of the request in response to the first public Internet protocol address of the remote client matching the second public Internet protocol address of the sender;

encrypting the requested data according to a second encryption scheme in response to the authenticity of the request being verified; and transferring the encrypted data to the remote client.

9. The method of claim 8, further comprising transmitting a setup package to the remote client, the setup package comprising cryptographic elements.

10. The method of claim 9, wherein the cryptographic elements comprise a list of encryption schemes, encryption keys, and an encryption scheme selection algorithm.

11. The method of claim 8, further comprising indicating the second encryption scheme to the client using an index into a shared list of encryption schemes, and indicating encryption keys to the client using an index into a shared list of encryption keys.

12. The method of claim 8, wherein the second encryption scheme is randomly selected from a list of available encryption schemes.

13. The method of claim 8, the method further comprising determining the first encryption scheme based on a current time value.

14. The method of claim 8, further comprising discarding the request in response to the first public Internet protocol address not matching the second public Internet protocol address for the request.

15. A computer program product comprising a non-transitory computer readable storage medium having program code embodied therein, the program code readable/executable by a processor for:
receiving a request for data, the request encrypted according to a first encryption scheme;

checking a first public Internet protocol address associated with the request, the first public Internet protocol address identifying the remote client that created the request, the first public Internet protocol address determined dynamically at the remote client at a time when the request is generated, the remote client querying a server to determine the first public IP address, the first public IP address stored in a field of a data packet that includes the request;

determining a second public Internet protocol address associated with the request, the second public Internet protocol address identifying a sender of the request, the second public Internet protocol address determined dynamically when the request is received, verifying an authenticity of the request in response to the first public Internet protocol address of the remote client matching the second public Internet protocol address of the sender;

encrypting the requested data according to a second encryption scheme in response to the authenticity of the request being verified; and transferring the encrypted data to the remote client.

16. The computer program product of claim 15, the program code further configured for transmitting a setup package to the remote client, the setup package comprising cryptographic elements.

17. The computer program product of claim 16, wherein the cryptographic elements comprise a list of encryption schemes, encryption keys, and a first encryption scheme selection algorithm.

18. The computing program product of claim 15, the program code further configured for indicating the second encryption scheme to the client using an index into a shared list of encryption schemes, and indicating encryption keys to the client using an index into a shared list of encryption keys.

19. The computer program product of claim 15, the program code further configured for randomly selecting the second encryption scheme from a list of available encryption schemes.

20. The computer program product of claim 15, the program code further configured for determining the first encryption scheme based on a current time.

21. The computer program product of claim 15, the program code further configured for discarding the request in response to the first public Internet protocol address not matching the second Internet protocol address for the request.

22. A method comprising:
  determining, dynamically, a first public Internet protocol address by querying a server for the first public IP address;
  requesting data from a remote server, a request encrypted according to a first encryption scheme and a first encryption key, the encrypted request comprising the first public Internet protocol address located in a field of a data packet that includes the request, and a second public Internet protocol address identifying a sender of the request, the second public Internet protocol address determined dynamically when the request is received at the remote server, wherein an authenticity of the request is verified in response to the first public Internet protocol address of the remote client matching the second public Internet protocol address of the sender; and
  receiving data from the remote server in response to the authenticity of the request being verified, the data encrypted using a second encryption scheme that is different from the first encryption scheme, the data comprising a third public Internet protocol address identifying the remote server.

* * * * *